United States Patent
Godsk et al.

(10) Patent No.: US 8,147,209 B2
(45) Date of Patent: Apr. 3, 2012

(54) WIND TURBINE BLADE

(75) Inventors: Kristian Balschmidt Godsk, Aarhus (DK); Thomas S. Bjertrup Nielsen, Randers (DK)

(73) Assignee: Vestas Wind Systems A/S, Aarhus N (DK)

( * ) Notice: Subject to any disclaimer, the term of this patent is extended or adjusted under 35 U.S.C. 154(b) by 967 days.

(21) Appl. No.: 11/884,969

(22) PCT Filed: Feb. 22, 2005

(86) PCT No.: PCT/IB2005/050639
§ 371 (c)(1),
(2), (4) Date: Apr. 15, 2008

(87) PCT Pub. No.: WO2006/090215
PCT Pub. Date: Aug. 31, 2006

(65) Prior Publication Data
US 2008/0206055 A1    Aug. 28, 2008

(51) Int. Cl.
*F03D 1/06*    (2006.01)
(52) U.S. Cl. .............................. 416/241 R; 416/DIG. 2
(58) Field of Classification Search .................. 416/238, 416/242, 243, DIG. 2, 241 R
See application file for complete search history.

(56) References Cited

U.S. PATENT DOCUMENTS

| | | | |
|---|---|---|---|
| 5,417,548 A * | 5/1995 | Tangler et al. | 416/223 R |
| 5,474,425 A | 12/1995 | Lawlor | |
| 6,068,446 A | 5/2000 | Tangler et al. | |
| 6,503,058 B1 * | 1/2003 | Selig et al. | 416/223 R |
| 6,749,399 B2 * | 6/2004 | Heronemus | 416/41 |
| 6,974,309 B2 * | 12/2005 | Seki | 416/227 R |
| 7,198,471 B2 * | 4/2007 | Gunneskov et al. | 416/229 R |
| 7,344,360 B2 * | 3/2008 | Wetzel | 416/238 |
| 2004/0217595 A1 | 11/2004 | Feddersen et al. | |

FOREIGN PATENT DOCUMENTS
WO    WO 2004/074681 A1    9/2004

OTHER PUBLICATIONS

W.A. Timmer and R.P.J.O.M. van Rooij, Summary of Delft University Wind Turbine Dedicated Airfoils, 2003, AIAA-2003-0352, pp. 1-11.*
Tangler et al., "NREL Airfoil Families for HAWTs," NASA STI/Recon Technical Report N, vol. 95, Jan. 1995.

* cited by examiner

*Primary Examiner* — Edward Look
*Assistant Examiner* — Liam McDowell
(74) *Attorney, Agent, or Firm* — Wood, Herron & Evans, L.L.P.

(57) ABSTRACT

A wind turbine comprising a wind turbine blade with high lift and/or low solidity is provided. The blade is directed towards pitch regulated wind turbines, which are operated at variable rotor speed and have blades longer than about 30 meters. The blade is for example advantageous in that it may provide reduced extreme and fatigue loads at the same or near the same power production.

29 Claims, 3 Drawing Sheets

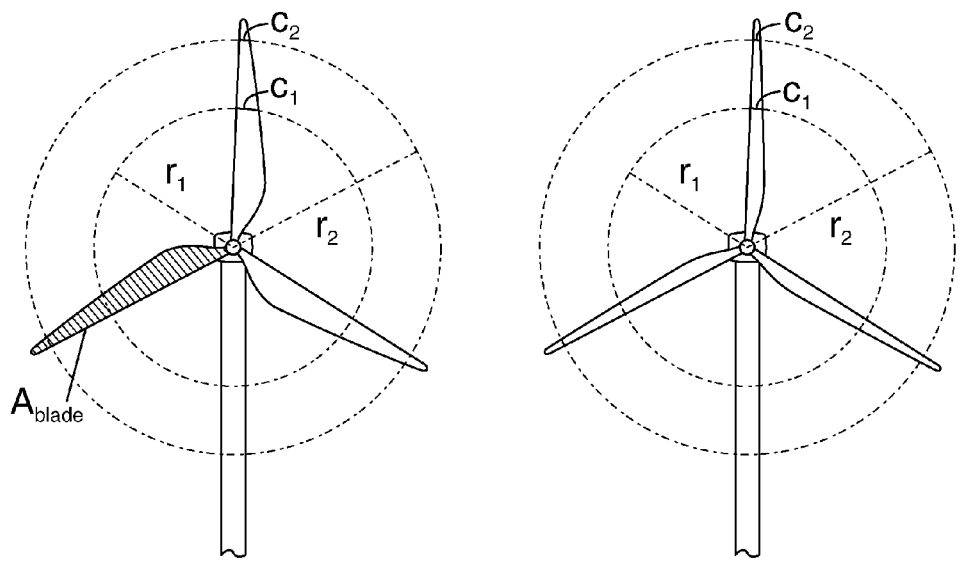
FIG. 5
PRIOR ART
FIG. 6
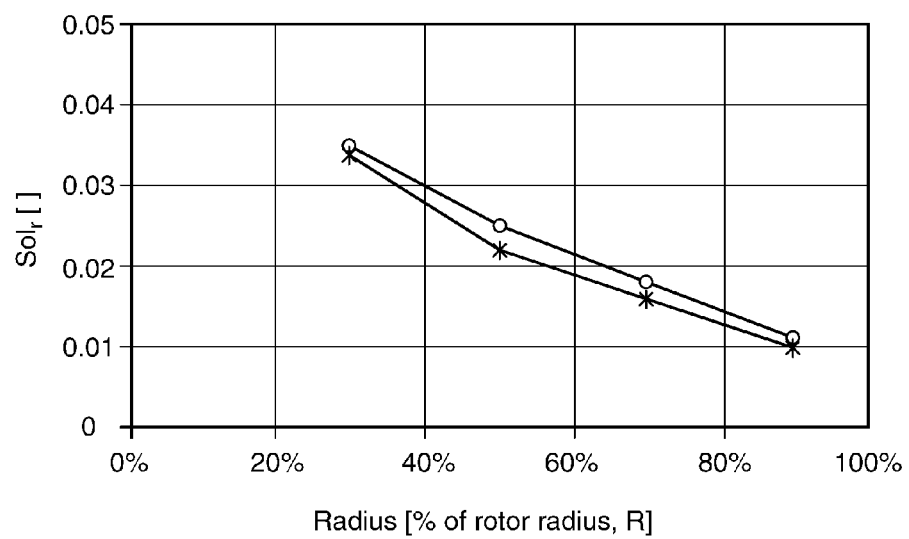
FIG. 7

WIND TURBINE BLADE

TECHNICAL FIELD OF THE INVENTION

The invention relates to a wind turbine comprising a wind turbine blade with a particular profile and airfoil design. More particularly, the invention relates to a wind turbine comprising a wind turbine blade with a relatively low radius specific solidity, which varies as a function of the distance from the turbine blade root.

The invention is mainly directed towards pitch regulated wind turbines, which are operated at variable rotor speed, and has blades longer than about 30 meters.

BACKGROUND OF THE INVENTION

A wind turbine blade cross section is typically referred to as a blade profile. The shape of the profile varies with the distance from the blade root. The blade is connected to the hub that is placed in the rotor centre. The profile has a chord, c, and a thickness, t, as shown in FIG. 1. The size of the chord and the thickness as well as the thickness to chord ratio varies as a function of the radius, r, i.e. the distance from the rotor centre to the blade cross section.

In principle, a wind turbine blade consists of a plurality of connected blade profiles. The blade and hence the individual profiles are rotated relative to the rotor plane during operation. The incoming wind is about orthogonal to the rotor plane, but since the blade is in motion, the effective angle and speed of the incoming wind (i.e. corresponding to a steady blade) depend on the speed of rotation of the blade. The effective angle is also referred to as the angle of attack, $\alpha$, as shown in FIG. 2. The effective wind speed that the profiles see is also referred to as the relative wind speed, w, as shown in FIG. 2.

The response of the aerodynamic profile of the blade to incoming wind may be separated into a lift component orthogonal to the effective incoming wind and a drag component that are in parallel to the effective incoming wind. The size of the components may be expressed as the lift coefficient, $C_L$, and the drag coefficient, $C_D$, respectively, as indicated in FIG. 2. In general, it is desired to have a high lift coefficient and a low drag coefficient.

In pitch regulated wind turbines with variable rotor speed, the variation of the angle of attack, $\alpha$, due to variation in wind speed is compensated by rotating the individual blades about a longitudinal axis, called pitching, and by controlling the rotor speed. Thereby the average angle of attack may be kept close to a desired value with regard to the average wind speed.

$C_L$-$C_D$ Plot

The lift coefficient corresponding to the value at the maximum ratio of $C_L/C_D$ is referred to as the design lift coefficient, $C_{L,d}$. The design lift coefficient is found as $C_L$ corresponding to the tangent to the $C_L$-$C_D$-curve through (0,0) in a $C_L$-$C_D$ plot, as show in FIG. 3. Typically each blade cross section is twisted slightly about the pitch axis so that each profile is operating at an angle of attack that corresponds to the design lift coefficient, $C_{L,d}$ for incoming wind speeds in the interval of 7-11 m/s.

$C_L$-$\alpha$ Plot

In FIG. 4, the lift coefficient $C_L$ is plotted as a function of the angle of attack, $\alpha$. It is observed that $C_L$ increases as the angle of attack is increased until $\alpha_{stall}$, above which the blade begins to stall. The maximum lift coefficient, $C_{L,max}$, corresponds to the lift coefficient at $\alpha_{stall}$. The maximum lift coefficient, $C_{L,max}$ varies as a function of the Reynolds number.

The Reynolds number is defined as:

$$Re = \frac{w \cdot c}{v}$$

Where w is the relative wind speed and $v$ is the kinematic viscosity of air. The maximum lift coefficient, $C_{L,max}$, also varies as a function of the roughness of the profile surface particularly on the leading edge. The values of lift coefficients mentioned in the present document refer to profiles with a smooth surface subjected to a two-dimensional airflow.

The angle of attack corresponding to $C_{L,d}$ is referred to as the design angle of attack, $\alpha_d$, and may be identified from a set of a $C_L$-$C_D$ plot and a corresponding $C_L$-$\alpha$ plot, as indicated in FIG. 3 and FIG. 4. It is the general perception in the art that a wind turbine should be operated at or near the design lift coefficient, $C_{L,d}$, to reduce drag and to prevent the blade from stalling accidentally. In other words, $C_{L,operation} \approx C_{L,d}$ and $\alpha_{operation} \approx \alpha_d$, where $\alpha_{operation}$ and $C_{L,operation}$, respectively, are the mean angle of attack and the corresponding mean lift coefficient during operation Gusts of Wind The pitch regulation is not sufficiently fast to respond to individual gusts of wind. Therefore, the instant angle of attack, $\alpha_{gust}$, upon a gust of wind is shifted to a larger angle of attack than the intended $\alpha_{operation}$. Wind turbine blade profiles are therefore traditionally designed such that the design angle of attack, $\alpha_d$, as derived from $C_{L,d}$ is substantially lower than $\alpha_{stall}$, as this prevents the blade from accidental stalling and hence increases the tolerance towards gusts of wind.

OBJECT OF THE INVENTION

It is the object of the invention to provide an improved wind turbine blade.

DISCLOSURE OF THE INVENTION

Solidity

The solidity of a wind turbine blade is the ratio between the area of the wind turbine blade projected into the rotor plane and the total area covered by the rotating blades, $A_{blade}$. The combined solidity, i.e. the sum of solidifies of the blades, is hence:

$$Sol = \frac{n \cdot A_{blade}}{\pi R^2}$$

where n is the number of wind turbine blades, e.g. 1, 2, 3 or 4 and R is the rotor radius. In FIG. 5 and FIG. 6, n is 3. The solidity is therefore a measure of the slimness of the blade in that the lower the solidity, the more slim the blades. When comparing the wind turbines in FIG. 5 and FIG. 6, it is evident that the blades in FIG. 5 have a larger solidity than the blades in FIG. 6.

Solidity may also be established for a specific radius, r, from the rotor center. The radius specific solidity of the wind turbine blade is given by:

$$Sol_r = \frac{n \cdot c_r}{2\pi R}$$

where $c_r$ is the chord at the specific radius. It should be observed that the radius specific solidity in general is independent on purely linear scaling of the blade except near the tip and near the root of the blade where structural considerations determines the solidity.

The improvement according to the above object of the invention is realised by a wind turbine operable by pitch regulation and variable rotor speed, having at least one wind turbine blade longer than 30 meters. The combined radius specific solidity of the blades is relatively low and the maximum lift coefficient, $C_{L,max}$, is relatively high. Preferably $Sol_r < 0.018$ for blade radius r=70% of the rotor radius R, and $C_{L,max} > 1.5$ for at least 80 radius-% of the blade, preferably for at least 90 radius-% of the blade. $C_{L,max}$ should be considered for a Reynolds number, $Re=3.0 \times 10^6$, and for a two-dimensional flow and a smooth profile surface.

The improvement may for example result in one or more of reduced extreme- and/or fatigue loads for substantially the same power production, improved durability of the blades and/or other structural or electrical components of the wind turbine, reduced weight of the blade and/or material consumption for manufacturing of the blade, and/or reduced weight and/or material consumption for manufacturing of other structural or electrical components of the wind turbine. However, other advantages would be realised by the skilled person when faced with one or more of the aspects of the invention.

BRIEF DESCRIPTION OF THE DRAWINGS

The invention will be explained more fully below with reference to exemplary embodiments as well as the drawings, in which
FIG. 5 shows a wind turbine with high solidity blades,
FIG. 6 shows a wind turbine with low solidity blades,
and
FIG. 7 shows a plot of a combined radius specific solidity for a preferred embodiment.

Figure 1:
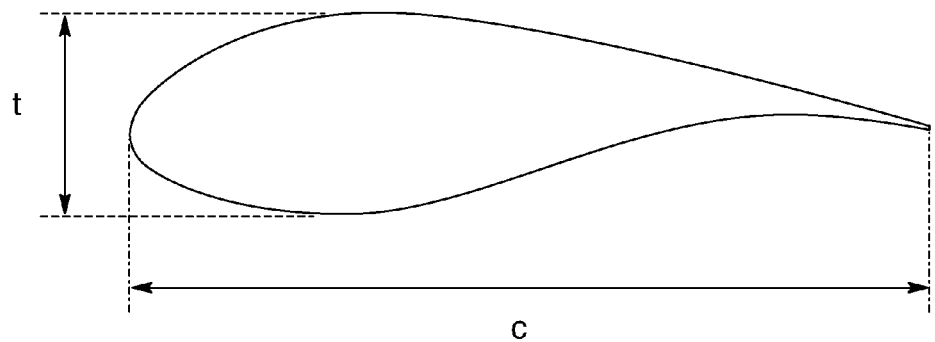
FIG. 1 shows a profile of a wind turbine blade.
Figure 2:
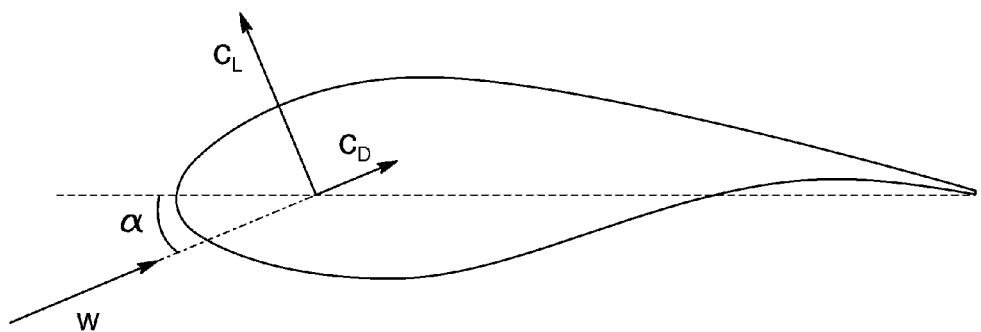
FIG. 2 shows a profile with incoming wind.
Figure 3:
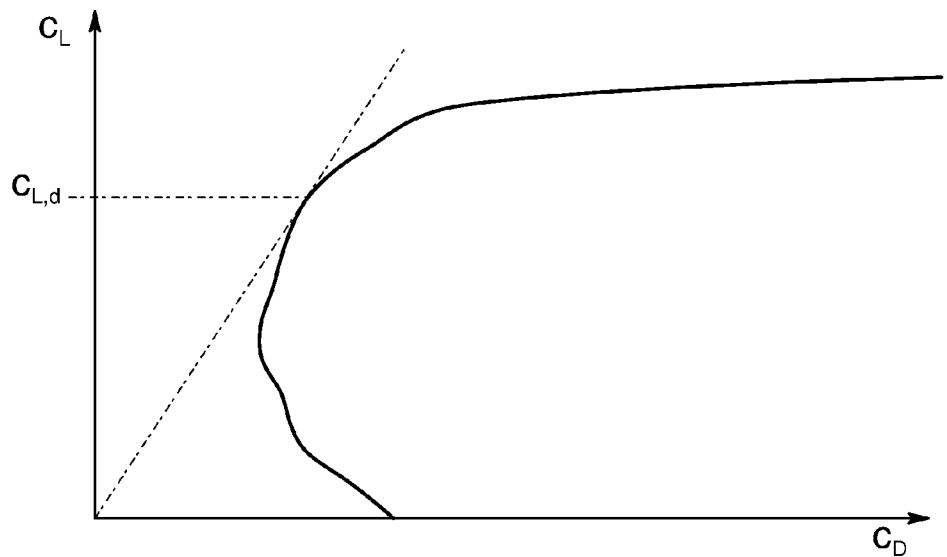
FIG. 3 shows a $C_L$-$C_D$ plot.

All the figures are highly schematic and not necessarily to scale, and they show only parts which are necessary in order to elucidate the invention, other parts being omitted or merely suggested.

DISCUSSION

By radius-% is herein meant a fraction of the blade corresponding to the same percentage of the longitudinal length of the blade. The fraction need not be one continuous part but may be made up by several parts of the profile. For example, a 50 radius-% corresponds to 25 m of a blade when the rotor diameter is 50 m, and the 50 radius-% may e.g. be made up by 5 meters of the blade root in combination with the outermost 5 meters of the blade tip and 15 meters around the middle of the blade.

Conditions Near the Blade Root

The airfoil at the root section of the blade is mainly dictated by structural considerations. This is acceptable as this section only covers a minor part of the overall power production. This invention is therefore primarily directed towards the outermost 30%-95% of the blade, whereas the considerations may in some cases similarly be applied to the root section.

Conditions Near the Blade Tip

The airfoil at the tip section, that is the outermost 95%-100% of the blade, is mainly dictated by getting the blade smoothly stopped while still maintaining the combination of low noise from the section and as high performance as possible. The shape of the tip section is important as tip vortices generate noise that can be dominant if noise issues are not taken properly into account during the design of the tip section.

Fatigue and Extreme Loads

An important issue in design of wind turbine blades is the resistance towards fatigue damage. In general, the fatigue is driven by the chord size, i.e. the larger the chord, the higher fatigue loads on the blade. Furthermore, the vibrations arising if the blade stalls also increase the fatigue damage. It is therefore a considerable advantage of the present invention that despite the blade is operated with a higher design angle of attack, $\alpha_d$, the fatigue characteristic of the blade is improved.

Extreme wind gusts with wind speeds up to 70 m/s generate extreme loads on the wind turbine. During extreme wind speeds, the wind turbine rotor is idling, that is rotating slowly or stopped with the blades in stop position and with no power production. The extreme loads are driven by the chord size, i.e. the larger the chord, the higher the extreme loads. It is therefore also a considerable advantage of the present invention that extreme loads are reduced.

Wind Turbine Blades with Low Solidity and High $C_{L,max}$

As wind turbines and wind turbine blades increase in size, light and stiff materials in the blades are needed to reduce the blade weight while still maintain a stiffness that is sufficient to prevent the blades from hitting the tower during gusty winds. Furthermore, the use of slender blades increases the need for materials with a high strength as both the chord and thickness of the blade in the different cross sections must be kept below certain values. Carbon fibres have proved to promote these properties. The amount of needed carbon fibres in the blades increases with the blade length. For slender blades larger than 30 m, the need for carbon fibres begins to exist. Hence there is a close connection between the use of slender blades larger than 30 m and the use of carbon fibres.

The induction, a, is a measure of the speed reduction of the wind upon passage of the wind turbine. Typically the induction should be about 0.33 for optimal operation. The induction of an airfoil increases with the chord size, c, and the lift coefficient, $C_L$, of the airfoil. An increase in $C_{L,d}$ therefore allows for a corresponding decrease in chord size and hence a lower solidity of the blade. It has been found that a suitable combination of an increase in $C_{L,d}$ with a decrease in solidity leads to reduced fatigue and extreme loads for substantially the same power production. The reduced loads result in cheaper components in the wind turbine and therefore an overall improved economy for the wind turbine.

Figure 4:
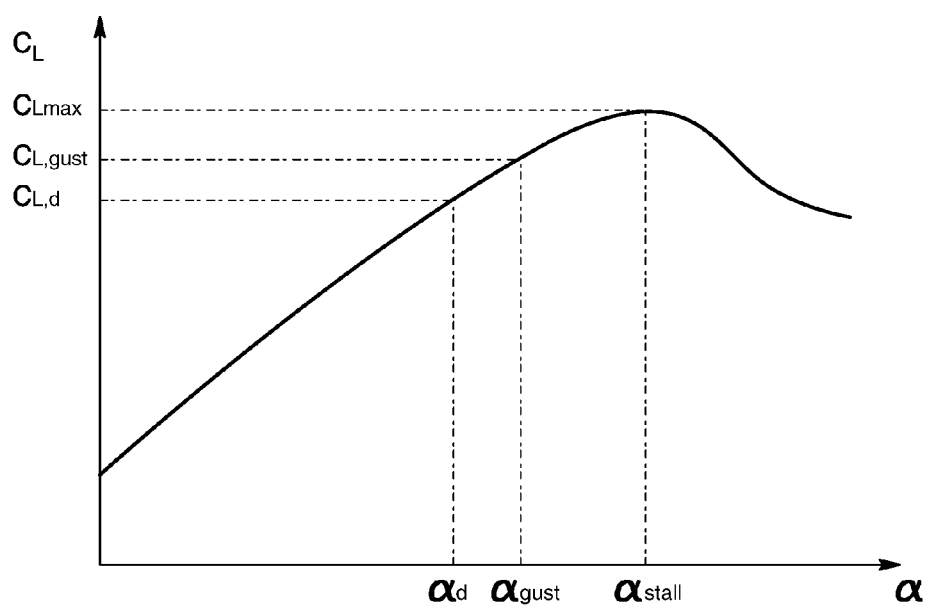
FIG. 4 shows a $C_L$-$\alpha$ plot.

Extreme loads but especially fatigue loads can be reduced by using a regulation strategy that pitches each blade individually during one rotor rotation. The main purpose of the individual pitch control is to reduce the fluctuations and/or cyclic variations in angle of attacks during one rotor rotation and due to that reduce the load variations. Fluctuations and/or cyclic variations in angle of attacks can occur from positive- and/or negative wind shear, yaw errors, wind turbines in wake or half wake of each other, local turbulence bubbles in the rotor plane, etc. As an example a situation with positive wind shear and a constant pitch angle results in higher angle of attacks when a blade is pointing upwards compared to when it is pointing downwards. This is because the wind speed in this situation is higher in the top of the rotor plane compared to in the bottom. By introducing a cyclic pitch angle variation during one rotor rotation, the load variations due to positive wind shear can be removed. Individual pitch control is only effective if the blade is kept away from the stall area, i.e. operating in the linear part of the $C_L(\alpha)$ curve on FIG. 4. It was realised by the inventor that the combination of high lift profiles, operation away from stall, and the use of individual pitch control lead to surprisingly large load reductions—particularly with regard to fatigue loads. The load reduction results in improved freedom to design the blade as well as an overall improved wind turbine economy.

The wind turbines and the blades according to the present invention are particularly durable with regard to fatigue and extreme loads, and surprisingly it has been found that for blades which combines low solidity and high lift the improved durability against fatigue and extreme loads may be achieved without significant decrease in the annular yield of the wind turbine.

Noise

It is important that noise from wind turbines in general is reduced as much as possible as neighbours close to wind turbines can be disturbed by the noise. On many wind turbine sites there are specific demands on the maximum noise level that the wind turbines create. Sometimes there are different demands on the maximum noise level at different hours during the day and night. The noise level coming from a wind turbine that are pitch regulated with variable rotor speed can be reduced by reducing the rotor speed and/or change the pitch angles. When the rotor speed is decreased, the angle of attack must be increased to achieve constant energy production. This results in operation much closer to stall, which is generally not desired. Surprisingly it has been found that by using profiles with high $C_{L,max}$, it is possible to reduce the wind turbine noise substantially with only a relatively small reduction in the power production. Furthermore, this may be realised without getting as close to stall as with conventional blades Table 1 shows the percentage difference in annual yield at a mean wind speed of 8 m/s for different maximum sound power levels valid for a wind turbine with high lift profile blades and standard profile blades, respectively Mode 0 corresponds to an operation based on maximum power production. Mode 3 and mode 5 correspond to operation with reduced rotor speed corresponding to reduced noise levels. It is seen that mode 0 results in a maximum sound power level of 105 dB(A), while mode 3 and mode 5 correspond to maximum sound power levels of 103 dB(A) and 100 dB(A), respectively

TABLE 1

Difference in annual yield at different sound power levels.

| Operating modes and maximum noise levels | Difference in annual yield [%] | |
|---|---|---|
| | High lift profile | Standard profile |
| Mode 0, 105 dB(A) | 100 | 100 |
| Mode 3, 103 dB(A) | 95 | 92 |
| Mode 5, 100 dB(A) | 86 | 77 |

Comparing the results in table 1, it is evident that a wind turbine blade with high lift profile generates more power for the same sound power level in the noise-reduced operating modes. For the example in table 1, the reduction of annual yield is about 50% larger for the standard profile blade compared to the blade with high lift profiles. Computer modelling has shown that typically the reduction of annual yields for the standard profiles are around 25% to 75% larger than for the high lift profiles according to the present invention High lift profiles with low solidity as discussed above are particularly advantageous as they combine the option of low noise operation with superior fatigue behaviour and hence allow for much more flexible design and operation.

The noise-reduced operation involves reducing the rotation speed of the rotor and adjusting the pitch angle so that the decrease in annual yield is minimised. This can be realised much more efficiently for high lift profiles than for standard profiles.

It should be observed that the blades according to the present invention may also be applied for stall regulated wind turbines. A stall regulated wind turbine with blades according to the present invention also exhibit superior durability with regard to fatigue and extreme loads.

EXAMPLES

Example A1

Wind turbine blades covered by the invention may be manufactured by conventional means well known in the field. However, it is advantageous that the blades include carbon fibre based reinforcement, and preferably the carbon fibres are introduced in the blade as pultruded or belt pressed cured members, as this supports the increased freedom to design wind turbine blades realised by the present invention to realise even better blades.

Example A2

In a preferred embodiment of the invention, a wind turbine, which may be operated by pitch regulation and variable rotor speed, has at least one wind turbine blade longer than 30 meters, such as three blades of about 50 meters. The combined radius specific solidity of the blades is below a linear interpolation between $Sol_r$=0.035 at blade radius r=30% of the rotor radius R
$Sol_r$=0.025 at blade radius r=50% of the rotor radius R
$Sol_r$=0.018 at blade radius r=70% of the rotor radius R
$Sol_r$=0.011 at blade radius r=90% of the rotor radius R for at least 50 radius-% of the blade(s) between blade radius r=30-90% of the rotor radius R. In FIG. 7, the upper piecewise linear line corresponds to such linear interpolation. In other words, if the combined radius specific solidity of the blades for the wind turbine according to this embodiment is drawn on the plot of FIG. 7, then the plot corresponding to the wind turbine according to this embodiment is below the lower curve in at least half of the interval between blade radius r=30-90% of the rotor radius R. The part of the plot corresponding to the wind turbine according to this embodiment, which part is under the line of FIG. 7, may be made up by several pieces of which are connected by pieces, which are above the line of FIG. 7.

Since it is advantageous to have a larger fraction of the blade below the line of FIG. 7, a preferably variant of this embodiment is when at least 75 radius-% of the blade(s) between blade radius r=30-90% of the rotor radius R, and even more preferably at least 95 radius-% of the blade(s) between blade radius r=30-90% of the rotor radius R.

Example B1

According to the invention, a wind turbine operable by pitch regulation and variable rotor speed is provided. The wind turbine has one, two, three or four blades, which are longer than 30 meters. The blades have a combined radius specific solidity of the blades, $Sol_r$<0.018 for blade radius r=70% of the rotor radius R. For at least 80 radius-% of the blade, the maximum lift coefficient, $C_{L,max}$>1.45 for Re=1.5× $10^6$, where $C_{L,max}$ is valid for a two-dimensional flow passing a smooth profile surface.

Example B2

In a variant of the wind turbine described in Example B1, a wind turbine operable by pitch regulation and variable rotor speed is provided. The turbine has two or three blades, which are longer than 30 meters. The blades have a combined radius specific solidity of the blades, $Sol_r < 0.018$ for blade radius $r=70\%$ of the rotor radius R. For at least 80 radius-% of the blade, the maximum lift coefficient, $C_{L,max} > 1.5$ for $Re=3.0 \times 10^6$, where $C_{L,max}$ is valid for a two-dimensional flow passing a smooth profile surface.

Example B3

In a variant of the wind turbine described in Example B1, a wind turbine operable by pitch regulation and variable rotor speed is provided. The turbine has two or three blades, which are longer than 30 meters. The blades have a combined radius specific solidity of the blades, $Sol_r < 0.018$ for blade radius $r=70\%$ of the rotor radius R. For at least 80 radius-% of the blade, the maximum lift coefficient, $C_{L,max} > 1.6$ for $Re=5.0 \times 10^6$, where $C_{L,max}$ is valid for a two-dimensional flow passing a smooth profile surface.

Example B4

In a variant of the wind turbine described in Example B1, at least 80 radius-% of the blade has a maximum lift coefficient, $C_{L,max} > 1.65$ for $Re=7.0 \times 10^6$, where $C_{L,max}$ is valid for a two-dimensional flow passing a smooth profile surface.

Example B5

In a variant of the wind turbine described in Example B1, at least 80 radius-% of the blade has a maximum lift coefficient, $C_{L,max} > 1.68$ for $Re=9.0 \times 10^6$, where $C_{L,max}$ is valid for a two-dimensional flow passing a smooth profile surface.

Example B6

In a variant of the wind turbine described in Example B1, at least 80 radius-% of the blade has a maximum lift coefficient, $C_{L,max} > 1.7$ for $Re=11.0 \times 10^6$, where $C_{L,max}$ is valid for a two-dimensional flow passing a smooth profile surface.

Example B7

A variant of the wind turbines described in Examples B1 to B6 includes one or more of the maximum lift coefficient requirements in Examples B1 to B6 so that at least 80 radius-% of the blade has
the maximum lift coefficient, $C_{L,max} > 1.45$ for $Re=1.5 \times 10^6$, and/or
the maximum lift coefficient, $C_{L,max} > 1.5$ for $Re=3.0 \times 10^6$, and/or
the maximum lift coefficient, $C_{L,max} > 1.6$ for $Re=5.0 \times 10^6$, and/or
the maximum lift coefficient, $C_{L,max} > 1.65$ for $Re=7.0 \times 10^6$, and/or
the maximum lift coefficient, $C_{L,max} > 1.68$ for $Re=9.0 \times 10^6$, and/or
the maximum lift coefficient, $C_{L,max} > 1.7$ for $Re=11.0 \times 10^6$,
where $C_{L,max}$ is valid for a two-dimensional flow passing a smooth profile surface.

Example B8

In a variant of the wind turbine described in Example B7, at least 90 radius-% of the blade has a maximum lift according to Example B7. Having a very high fraction of the blade with a high lift profile, increases the advantage of the high lift profiles, i.e. improved noise reduction properties.

Example B9

A variant of the wind turbine described in Examples B1 to B8 includes one or more of the maximum lift coefficient requirements in Example B1 to B6 so that at least 80 radius-% of the blade, preferably 90% of the blade, has
the maximum lift coefficient $C_{L,max} > 1.5$, for $Re=1.5 \times 10^6$, and/or
the maximum lift coefficient $C_{L,max} > 1.58$, for $Re=3.0 \times 10^6$, and/or
the maximum lift coefficient $C_{L,max} > 1.64$, for $Re=5.0 \times 10^6$, and/or
the maximum lift coefficient $C_{L,max} > 1.68$, for $Re=7.0 \times 10^6$, and/or
the maximum lift coefficient $C_{L,max} > 1.71$, for $Re=9.0 \times 10^6$, and/or
the maximum lift coefficient $C_{L,max} > 1.73$, for $Re=11.0 \times 10^6$
where $C_{L,max}$ is valid for a two-dimensional flow passing a smooth profile surface.

Example B10

In a preferred variant of the wind turbines described in Examples B1 to B9, the blades have a combined radius specific solidity of the blades, $Sol_r < 0.016$ for blade radius $r=70\%$ of the rotor radius R. The decreased solidity leads to an increased fatigue tolerance.

Example C

In a variant of the wind turbines in the B Examples, the radii range, wherein the maximum lift requirement is provided, corresponds to thickness to chord ratios of $t/c < 24\%$ to $t/c > 15\%$ except for the blade tip corresponding to blade radius $r > 96\%$ of R rotor radius. In a variant of this wind turbine, the radii range corresponds to $t/c < 27\%$ to $t/c > 15\%$ with the proviso that $r < 96\%$ of R.

Example D1

According to the invention, a wind turbine operable by pitch regulation and variable rotor speed is provided. The wind turbine has at least one wind turbine blade, which is longer than 30 meters. The blades have a combined radius specific solidity of the blades, $Sol_r < 0.025$ for blade radius $r=50\%$ of the rotor radius R. For at least 80 radius-% of the blade, preferably for at least 90 radius-% of the blade the maximum lift fulfils one or more of the following requirements:
the maximum lift coefficient $C_{L,max} > 1.5$, for $Re=1.5 \times 10^6$, and/or
the maximum lift coefficient $C_{L,max} > 1.58$, for $Re=3.0 \times 10^6$, and/or
the maximum lift coefficient $C_{L,max} > 1.64$, for $Re=5.0 \times 10^6$, and/or
the maximum lift coefficient $C_{L,max} > 1.68$, for $Re=7.0 \times 10^6$, and/or
the maximum lift coefficient $C_{L,max} > 1.71$, for $Re=9.0 \times 10^6$, and/or
the maximum lift coefficient $C_{L,max} > 1.73$, for $Re=11.0 \times 10^6$ where $C_{L,max}$ is valid for a two-dimensional flow passing a smooth profile surface.

Example D2

In a preferred embodiment of the wind turbine of Example D1, the $Sol_r<0.023$ for blade radius r=50%; and more preferably $Sol_r<0.022$ for blade radius r=50%.

In one embodiment, the combined radius specific solidity of the blades is 0.0225 at r=50% of R and $C_{L,max}$=1.51-1.60 for Re=1.5×10⁶ for 85% of the blade.

Example D3

According to the invention, a wind turbine operable by pitch regulation and variable rotor speed is provided. The wind turbine has at least one wind turbine blade, which is longer than 30 meters. The blades have a combined radius specific solidity of the blades, $Sol_r<0.011$ for blade radius r=90% of the rotor radius R. For at least 80 radius-% of the blade, preferably for at least 90 radius-% of the blade, the maximum lift fulfils one or more of the following requirements:
 the maximum lift coefficient, $C_{L,max}>1.45$ for Re=1.5×10⁶, and/or
 the maximum lift coefficient, $C_{L,max}>1.5$ for Re=3.0×10⁶, and/or
 the maximum lift coefficient, $C_{L,max}>1.6$ for Re=5.0×10⁶, and/or
 the maximum lift coefficient, $C_{L,max}>1.65$ for Re=7.0×10⁶, and/or
 the maximum lift coefficient, $C_{L,max}>1.68$ for Re=9.0×10⁶, and/or
 the maximum lift coefficient, $C_{L,max}>1.7$ for Re=11.0×10⁶, where $C_{L,max}$ is valid for a two-dimensional flow passing a smooth profile surface.

Example D4

In a preferred embodiment of the wind turbine of Example D1, the $Sol_r<0.010$ for blade radius r=90%.

In one embodiment, the combined radius specific solidity of the blades is 0.009 at r=90% of R and $C_{L,max}$=1.45-1.50 for Re=1.6×10⁶ for 85% of the blade.

Example D5

According to the invention, a wind turbine operable by pitch regulation and variable rotor speed is provided. The wind turbine has at least one wind turbine blade, which is longer than 30 meters. The blades have a combined radius specific solidity of the blades, $Sol_r<0.035$ for blade radius r=30% of the rotor radius R. For at least 80 radius-% of the blade, preferably for at least 90 radius-% of the blade, the maximum lift fulfils one or more of the following requirements:
 the maximum lift coefficient, $C_{L,max}>1.45$ for Re=1.5×10⁶, and/or
 the maximum lift coefficient, $C_{L,max}>1.5$ for Re=3.0×10⁶, and/or
 the maximum lift coefficient, $C_{L,max}>1.6$ for Re=5.0×10⁶, and/or
 the maximum lift coefficient, $C_{L,max}>1.65$ for Re=7.0×10⁶, and/or
 the maximum lift coefficient, $C_{L,max}>1.68$ for Re=9.0×10⁶, and/or
 the maximum lift coefficient, $C_{L,max}>1.7$ for Re=11.0×10⁶, where $C_{L,max}$ is valid for a two-dimensional flow passing a smooth profile surface.

In one embodiment, the combined radius specific solidity of the blades is 0.034 at r=30% of R and $C_{L,max}$=1.45-1.50 for Re=1.5×10⁶ for 80% of the blade.

Example D6

In a preferred embodiment of the wind turbine of Example D1, the $Sol_r<0.034$ for blade radius r=30%.

Example D7

In a preferred embodiment of the wind turbines of Examples D1 to D6, the wind turbine blade also fulfils the requirements corresponding to one or more of the Examples B, C and the other D.

Example E

In one aspect of the invention, the combined radius specific solidity for a wind turbine corresponding to any one of the above examples decreases substantially linearly over a substantial lengthwise part of the blade. By substantially linearly is meant that the combined radius specific solidity derives from linearity by less than 2% of the radius specific solidity, preferably less than 1% of the radius specific solidity. In one embodiment, the combined radius specific solidity decreases substantially linearly between radius r=60% of the rotor radius R to r=80% of R. In a preferred embodiment, the substantially linear decrease is from about r=50% of R to about r=90% of R. In a particularly preferred embodiment, the substantially linear decrease is from about r=40% of R to about r=90% of R. The substantially linear decrease is advantageous in that it allows for a simple design and arrangement of reinforcement since the momentum of such a blade typically also varies linearly.

Example F

According to the invention, a wind turbine operable by pitch regulation and variable rotor speed is provided. The wind turbine has at least one wind turbine blade longer than 30 meters. For the outer part of the blade corresponding to a radius range for thickness to chord ratio t/c<21% except for the tip part where r>96% of R, the blades have design lift values of $C_{L,d}>1.3$, preferably $C_{L,d}>1.4$, for Re=3.0-11×10⁶ corresponding to two-dimensional flow passing a smooth profile surface.

In a preferred variety of such wind turbine blade, the above design lift values extend to a larger part of the blade, namely for t/c<24% except for the tip part corresponding to r>96% of R.

Example G

According to the invention, a wind turbine operable by pitch regulation and variable rotor speed is provided. The wind turbine has at least one wind turbine blade longer than 30 meters. For at least 90% of the blade in the range between blade radius r=50% of R to r=80% of R, the design lift value is $C_{L,d}>1.3$, preferably $C_{L,d}>1.4$ for Re=3.0-11×10⁶ corresponding to two-dimensional flow passing a smooth profile surface.

In a preferred variety of such wind turbine blade, the above design lift values extend to a larger part of the blade, namely for at least 90% of the blade in the range between blade radius r=30% of R to r=90% of R.

It should be observed that an individual feature or combination of features from an embodiment or an example of the invention described herein, as well as obvious variations thereof, are combinable with or exchangeable for features of the other embodiments described herein, unless the person skilled in the art would immediately realise that the resulting embodiment is not physically feasible.

The invention claimed is:

1. A wind turbine operable by pitch regulation and variable rotor speed, comprising at least one wind turbine blade longer than 30 meters, where a combined radius specific solidity $Sol_r$ is below a linear interpolation between:
   $Sol_r$=0.035 at blade radius r=30% of the rotor radius R
   $Sol_r$=0.025 at blade radius r=50% of the rotor radius R
   $Sol_r$=0.018 at blade radius r=70% of the rotor radius R
   $Sol_r$=0.011 at blade radius r=90% of the rotor radius R,
   for at least 50 radius-% of the blade(s) between blade radius r=30-90% of the rotor radius R,
   where the maximum lift coefficient $C_{L,max}$>1.45 for a Reynolds number Re=1.5×10$^6$.

2. The wind turbine according to claim 1, where the combined radius specific solidity is below a linear interpolation between:
   $Sol_r$=0.034 at blade radius r=30% of the rotor radius R
   $Sol_r$=0.022 at blade radius r=50% of the rotor radius R
   $Sol_r$=0.016 at blade radius r=70% of the rotor radius R
   $Sol_r$=0.010 at blade radius r=90% of the rotor radius R,
   for at least 50 radius-% of the blade(s) between blade radius r=30-90% of the rotor radius R.

3. The wind turbine according to claim 2, where the combined radius specific solidity is below a linear interpolation between:
   $Sol_r$=0.034 at blade radius r=30% of the rotor radius R
   $Sol_r$=0.022 at blade radius r=50% of the rotor radius R
   $Sol_r$=0.016 at blade radius r=70% of the rotor radius R
   $Sol_r$=0.010 at blade radius r=90% of the rotor radius R,
   for at least 75 radius-% of the blade(s) between blade radius r=30-90% of the rotor radius R.

4. The wind turbine according to claim 2, where the combined radius specific solidity is below a linear interpolation between:
   $Sol_r$=0.034 at blade radius r=30% of the rotor radius R
   $Sol_r$=0.022 at blade radius r=50% of the rotor radius R
   $Sol_r$=0.016 at blade radius r=70% of the rotor radius R
   $Sol_r$=0.010 at blade radius r=90% of the rotor radius R,
   for at least 95 radius-% of the blade(s) between blade radius r=30-90% of the rotor radius R.

5. The wind turbine according to claim 1, wherein
   the maximum lift coefficient $C_{L,max}$>1.5, for Re=1.5×10$^6$, and/or
   the maximum lift coefficient $C_{L,max}$>1.58, for Re=3.0×10$^6$, and/or
   the maximum lift coefficient $C_{L,max}$>1.64, for Re=5.0×10$^6$ and/or
   the maximum lift coefficient $C_{L,max}$>1.68, for Re=7.0×10$^6$, and/or
   the maximum lift coefficient $C_{L,max}$>1.71, for Re=9.0×10$^6$, and/or
   the maximum lift coefficient $C_{L,max}$>1.73, for Re=11.0×10$^6$
   where $C_{L,max}$ is valid for a two-dimensional flow passing a smooth profile surface for at least 80 radius-% of the blade.

6. The wind turbine according to claim 5, wherein $C_{L,max}$ is valid for a two-dimensional flow passing a smooth profile surface for at least 90 radius-% of the blade.

7. The wind turbine according to claim 1, wherein
   the maximum lift coefficient, $C_{L,max}$>1.45 for Re=1.5×10$^6$, and/or
   the maximum lift coefficient, $C_{L,max}$>1.5 for Re=3.0×10$^6$, andor
   the maximum lift coefficient, $C_{L,max}$>1.6 for Re=5.0×10$^6$, and/or,
   the maximum lift coefficient, $C_{L,max}$>1.65 for Re=7.0×10$^6$, and/or
   the maximum lift coefficient, $C_{L,max}$>1.68 for Re=9.0×10$^6$, and/or
   the maximum lift coefficient, $C_{L,max}$>1.7 for Re=11.0×10$^6$
   where $C_{L,max}$ is valid for a two-dimensional flow passing a smooth profile surface, for profiles in the radius range corresponding to t/c<27% to t/c>15% with the proviso that r<96% of R.

8. The wind turbine according to claim 7, wherein $C_{L,max}$ is valid for a two-dimensional flow passing a smooth profile surface, for profiles in the radius range corresponding to t/c<24% to t/c>15% with the proviso that r<96% of R.

9. The wind turbine according to claim 1, wherein
   the maximum lift coefficient $C_{L,max}$>1.5, for Re=1.5×10$^6$, and/or
   the maximum lift coefficient $C_{L,max}$>1.58, for Re=3.0×10$^6$, and/or
   the maximum lift coefficient $C_{L,max}$>1.64, for Re=5.0×10$^6$, and/or
   the maximum lift coefficient $C_{L,max}$>1.68, for Re=7.0×10$^6$, and/or
   the maximum lift coefficient $C_{L,max}$>1.71, for Re=9.0×10$^6$, and/or
   the maximum lift coefficient $C_{L,max}$>1.73, for Re=11.0×10$^6$
   where $C_{L,max}$ is valid for a two-dimensional flow passing a smooth profile surface, for profiles in the radius range corresponding to t/c<27% to t/c>15% with the proviso that r<96% of R.

10. The wind turbine according to claim 9, wherein $C_{L,max}$ is valid for a two-dimensional flow passing a smooth profile surface, for profiles in the radius range corresponding to t/c<24% to t/c>15% with the proviso that r<96% of R.

11. The wind turbine according to claim 1, wherein the combined radius specific solidity decreases substantially linearly between blade radius r=40% of R to r=90% of R.

12. The wind turbine according to claim 11, wherein the combined radius specific solidity decreases substantially linearly between blade radius r=50% of R to r=90% of R.

13. The wind turbine according to claim 11, wherein the combined radius specific solidity decreases substantially linearly between blade radius r=60% of R to r=80% of R.

14. The wind turbine according to claim 1, operable by pitch regulation and variable rotor speed, having at least one wind turbine blade longer than 30 meters, wherein the $C_{L,d}$>1.3 for Re=3.0-11×10$^6$ corresponding to two-dimensional flow passing a smooth profile surface and for t/c<24%, with the proviso that r>96% of R.

15. The wind turbine according to claim 14, wherein the $C_{L,d}$>1.3 for Re=3.0-11×10$^6$ corresponding to two-dimensional flow passing a smooth profile surface and for t/c<21%, with the proviso that r>96% of R.

16. The wind turbine according to claim 14 and operable by pitch regulation and variable rotor speed, having at least one wind turbine blade longer than 30 meters, wherein $C_{L,d}$>1.4 for Re=3.0-11×10$^6$ corresponding to two-dimensional flow passing a smooth profile surface and for t/c<24%, with the proviso that r>96% of R.

17. The wind turbine according to claim 16 wherein the $C_{L,d}>1.4$ for $Re=3.0\text{-}11\times10^6$ corresponding to two-dimensional flow passing a smooth profile surface and for t/c<21%, with the proviso that r>96% of R.

18. The wind turbine, according to claim 1, operable by pitch regulation and variable rotor speed, having at least one wind turbine blade longer than 30 meters, wherein the $C_{L,d}>1.3$ for $Re=3.0\text{-}11\times10^6$ corresponding to two-dimensional flow passing a smooth profile surface and for at least 90% of the blade in the range between blade radius r=30% of R to r=90% of R.

19. The wind turbine according to claim 18, wherein the $C_{L,d}>1.3$ for $Re=3.0\text{-}11\times10^6$ corresponding to two-dimensional flow passing a smooth profile surface and for at least 90% of the blade in the range between blade radius r=50% of R to r=80% of R.

20. The wind turbine according to claim 18 and operable by pitch regulation and variable rotor speed, having at least one wind turbine blade longer than 30 meters, wherein the $C_{L,d}>1.4$ for $Re=3.0\text{-}11\times10^6$ corresponding to two-dimensional flow passing a smooth profile surface and for at least 90% of the blade in the range between blade radius r=30% of R to r=90% of R.

21. The wind turbine according to claim 20, wherein the $C_{L,d}>1.4$ for $Re=3.0\text{-}11\times10^6$ corresponding to two-dimensional flow passing a smooth profile surface and for at least 90% of the blade in the range between blade radius r=50% of R to r=80% of R.

22. The wind turbine according to claim 1, wherein said at least one wind turbine blade comprises carbon fibres.

23. The wind turbine according to claim 22, wherein the carbon fibres are main reinforcement fibres in at least one section of the wind turbine blade.

24. The wind turbine according to claim 22, wherein the carbon fibres are pultruded or belt pressed cured members.

25. A method of operation of a wind turbine according to claim 1 under noise reduction condition comprising the steps of:
   adjusting the rotation speed to below nominal rotation speed, and
   adjusting the pitch angle to minimise the decrease in annual yield.

26. The wind turbine according to claim 1, wherein
   the maximum lift coefficient, $C_{L,max}>1.4$ for $Re=1.5\times10^6$, and/or
   the maximum lift coefficient, $C_{L,max}>1.5$ for $Re=3.0\times10^6$, and/or
   the maximum lift coefficient, $C_{L,max}>1.6$ for $Re=5.0\times10^6$, and/or
   the maximum lift coefficient, $C_{L,max}>1.65$ for $Re=7.0\times10^6$, and/or
   the maximum lift coefficient, $C_{L,max}>1.68$ for $Re=9.0\times10^6$, and/or
   the maximum lift coefficient, $C_{L,max}>1.7$ for $Re=11.0\times10^6$,
   where $C_{L,max}$ is valid for a two-dimensional flow passing a smooth profile surface, for at least 80 radius-% of the blade.

27. The wind turbine according to claim 26, wherein $C_{L,max}$ is valid for a two-dimensional flow passing a smooth profile surface, for at least 90 radius-% of the blade.

28. The wind turbine according to claim 1, where the combined radius specific solidity is below a linear interpolation between:
   $Sol_r=0.035$ at blade radius r=30% of the rotor radius R
   $Sol_r=0.025$ at blade radius r=50% of the rotor radius R
   $Sol_r=0.018$ at blade radius r=70% of the rotor radius R
   $Sol_r=0.011$ at blade radius r=90% of the rotor radius R,
   for at least 75 radius-% of the blade(s) between blade radius r=30-90% of the rotor radius R.

29. The wind turbine according to claim 1, where the combined radius specific solidity is below a linear interpolation between:
   $Sol_r=0.035$ at blade radius r=30% of the rotor radius R
   $Sol_r=0.025$ at blade radius r=50% of the rotor radius R
   $Sol_r=0.018$ at blade radius r=70% of the rotor radius R
   $Sol_r=0.011$ at blade radius r=90% of the rotor radius R,
   for at least 95 radius-% of the blade(s) between blade radius r=30-90% of the rotor radius R.

* * * * *

UNITED STATES PATENT AND TRADEMARK OFFICE
CERTIFICATE OF CORRECTION

PATENT NO. : 8,147,209 B2
APPLICATION NO. : 11/884969
DATED : April 3, 2012
INVENTOR(S) : Kristian Balschmidt Godsk et al.

It is certified that error appears in the above-identified patent and that said Letters Patent is hereby corrected as shown below:

Column 1

Line 13, change "has" to --have--.

Line 40, delete "in".

Column 2

Line 7, change "Where" to --where--.

Line 22, change "operation" to --operation.--

Line 43, change "solidifies" to --solidities--.

Column 3

Line 3, change "determines" to --determine--.

Column 4

Line 25, change "maintain" to --maintaining--.

Line 52, change "angle" to --angles-- and "attacks" to --attack--.

Line 54, change "angle" to --angles-- and "attacks" to --attack--.

Line 59, change "angle" to --angles-- and "attacks" to --attack--.

Line 67, change "inventor" to --inventors--.

Signed and Sealed this
Thirty-first Day of July, 2012

David J. Kappos
*Director of the United States Patent and Trademark Office*

CERTIFICATE OF CORRECTION (continued)
U.S. Pat. No. 8,147,209 B2

Column 5

Line 2, change "lead" to --leads--.

Line 21, change "are" to --is--.

Line 22, change "change" to --changing--.

Line 63, change "invention High" to --invention. High--.

Column 6

Line 9, change "exhibit" to --exhibits--.

Line 51, change "preferably" to --preferable--.

Column 12

Claim 7, Line 5, change "andor" to --and/or--.